(12) United States Patent
Sasaki

(10) Patent No.: US 12,394,394 B2
(45) Date of Patent: Aug. 19, 2025

(54) DISPLAY CONTROL APPARATUS USED FOR COLOR MATCHING BETWEEN REFERENCE IMAGE PICKUP APPARATUS AND ADJUSTMENT IMAGE PICKUP APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masatsugu Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 18/184,780

(22) Filed: Mar. 16, 2023

(65) Prior Publication Data

US 2023/0317031 A1    Oct. 5, 2023

(30) Foreign Application Priority Data

Mar. 29, 2022   (JP) .................................. 2022-053840

(51) Int. Cl.
*G09G 5/06*   (2006.01)
*G06V 10/74*   (2022.01)

(52) U.S. Cl.
CPC ............. *G09G 5/06* (2013.01); *G06V 10/761* (2022.01); *G09G 2320/0666* (2013.01)

(58) Field of Classification Search
CPC ............. G09G 5/06; G09G 2320/0666; G09G 3/2003; G09G 5/02; G09G 2320/0242; G09G 2320/0693; G09G 2340/06; G06V 10/761; G06V 10/56

USPC ......................................................... 345/601
See application file for complete search history.

(56) References Cited

U.S. PATENT DOCUMENTS

| 6,081,254 A * | 6/2000 | Tanaka ................. H04N 17/002 |
| | | 358/518 |
| 2005/0179918 A1* | 8/2005 | Kurumisawa ............ G09G 5/02 |
| | | 358/1.9 |
| 2013/0002910 A1* | 1/2013 | Sambonsugi .......... H04N 25/68 |
| | | 348/246 |

(Continued)

FOREIGN PATENT DOCUMENTS

| JP | 2003-224775 A | 8/2003 |
| JP | 2018-088618 A | 6/2018 |

*Primary Examiner* — Sheree N Brown
(74) *Attorney, Agent, or Firm* — Cowan, Liebowitz & Latman, P.C.

(57) ABSTRACT

A display control apparatus that easily discriminates residual color difference between a plurality of image pickup apparatuses at a site where the image pickup apparatuses are used. The display control apparatus including a memory device that stores a set of instructions, and at least one processor that executes the set of instructions to obtain an adjustment image from an adjustment image pickup apparatus that performs predetermined color matching with a reference image pickup apparatus, generate residual color difference information showing color difference from a reference image picked up by the reference image pickup apparatus that remains in the adjustment image, and generate display information from the residual color difference information.

12 Claims, 18 Drawing Sheets

(56) References Cited

U.S. PATENT DOCUMENTS

| | | | |
|---|---|---|---|
| 2014/0168253 A1* | 6/2014 | Arai | H04N 17/02 |
| | | | 345/593 |
| 2018/0295356 A1* | 10/2018 | Lee | H04N 17/02 |
| 2019/0200046 A1* | 6/2019 | Lucas | H04N 19/176 |
| 2022/0026276 A1* | 1/2022 | Harvill | G01J 3/0289 |
| 2023/0177665 A1* | 6/2023 | Tada | G06T 7/90 |
| | | | 382/165 |
| 2024/0169955 A1* | 5/2024 | Maekawa | G06V 10/761 |

* cited by examiner

*FIG. 5*

| PATCH | REFERENCE CAMERA | | | TARGET CAMERA | | |
|---|---|---|---|---|---|---|
| | R | G | B | R | G | B |
| COLOR PATCH401:R(255,0,0) | rR1 | rG1 | rB1 | tR1 | tG1 | tB1 |
| COLOR PATCH402:G(0,255,0) | rR2 | rG2 | rB2 | tR2 | tG2 | tB2 |
| COLOR PATCH403:B(0,0,255) | rR3 | rG3 | rB3 | tR3 | tG3 | tB3 |

*FIG. 6*

| PATCH | REFERENCE CAMERA | | | TARGET CAMERA | | |
|---|---|---|---|---|---|---|
| | X | Y | Z | X | Y | Z |
| COLOR PATCH401:R(255,0,0) | rX1 | rY1 | rZ1 | tX1 | tY1 | tZ1 |
| COLOR PATCH402:G(0,255,0) | rX2 | rY2 | rZ2 | tX2 | tY2 | tZ2 |
| COLOR PATCH403:B(0,0,255) | rX3 | rY3 | rZ3 | tX3 | tY3 | tZ3 |

ARITHMETIC MATRIX:R   ARITHMETIC MATRIX:T

*FIG. 7*

| In | | | Out | | |
|---|---|---|---|---|---|
| R | G | B | R | G | B |
| 0 | 0 | 0 | 0 | 0 | 0 |
| 0 | 0 | 16 | 0 | 0 | 17 |
| 0 | 0 | 32 | 0 | 0 | 33 |

...

| 255 | 255 | 255 | 255 | 255 | 255 |

FIG. 9

| PATCH | TARGET CAMERA | | |
|---|---|---|---|
| | R | G | B |
| COLOR PATCH401:R(255,0,0) | htR1 | htG1 | htB1 |
| COLOR PATCH402:G(0,255,0) | htR2 | htG2 | htB2 |
| COLOR PATCH403:B(0,0,255) | htR3 | htG3 | htB3 |

FIG. 10

| PATCH | TARGET CAMERA | | |
|---|---|---|---|
| | X | Y | Z |
| COLOR PATCH401:R(255,0,0) | htX1 | htY1 | htZ1 |
| COLOR PATCH402:G(0,255,0) | htX2 | htY2 | htZ2 |
| COLOR PATCH403:B(0,0,255) | htX3 | htY3 | htZ3 |

ARITHMETIC MATRIX:H

*FIG. 12*

| RESIDUAL COLOR DIFFERENCE VALUE D | CONVERSION COLOR | | |
|---|---|---|---|
| | R | G | B |
| $0 \leq D < 1.0$ | NON-CONVERSION | NON-CONVERSION | NON-CONVERSION |
| $1.0 \leq D < 2.0$ | 128 | 0 | 0 |
| $2.0 \leq D$ | 255 | 0 | 0 |

DISPLAY CONTROL APPARATUS USED FOR COLOR MATCHING BETWEEN REFERENCE IMAGE PICKUP APPARATUS AND ADJUSTMENT IMAGE PICKUP APPARATUS, CONTROL METHOD THEREFOR, AND STORAGE MEDIUM STORING CONTROL PROGRAM THEREFOR

BACKGROUND OF THE INVENTION

Field of the Invention

The present invention relates to a display control apparatus used for color matching between a reference image pickup apparatus and an adjustment image pickup apparatus, a control method therefor, and a storage medium storing a control program therefor.

Description of the Related Art

Japanese Laid-Open Patent Publication (Kokai) No. 2018-088618 (JP 2018-088618A) discloses an image pickup apparatus. This image pickup apparatus allocates a pixel value of a saturation-pixel warning color to a saturation pixel in an image picked up by an image pickup system. Moreover, the image pickup apparatus allocates a pixel value, which is obtained by converting an imaging color gamut into a display color gamut, to a pixel within the display color gamut in the image picked up by the image pickup system. Furthermore, the image pickup apparatus allocates a pixel value of an out-of-display-color-gamut warning color to a pixel without the display color gamut in the image picked up by the image pickup system.

Japanese Laid-Open Patent Publication (Kokai) No. 2003-224775 (JP 2003-224775A) discloses a technique that enables a user to easily visually recognize a part changed in time series of an object by adding a difference image between a plurality of images picked up in time series to an image that is obtained by lowering contrast of the difference image.

Incidentally, such an image pickup apparatus picks up a static image or a video image by receiving light entering through an optical system using an image sensor like a CCD sensor or a CMOS sensor, for example. Then, an image pickup apparatus may be used with another image pickup apparatus. In this case, even if a plurality of image pickup apparatuses pick up the same object, colors of the object in images may be different because of difference in light receiving characteristic between the image sensors of the image pickup apparatuses. Hereinafter, difference between colors in images picked up by image pickup apparatuses is called color difference.

In order to correct the color difference, it is considerable to use one image pickup apparatus as a reference image pickup apparatus, to use another image pickup apparatus as an adjustment image pickup apparatus, and to generate a correction lookup table used by the adjustment image pickup apparatus so as to match colors. This should be able to match the colors of the image of the adjustment image pickup apparatus with that of the reference image pickup apparatus.

However, even if the adjustment image pickup apparatus uses such a correction lookup table, not all the colors of the pickup image of the adjustment image pickup apparatus match the colors of the pickup image of the reference image pickup apparatus. On a site where a plurality of image pickup apparatuses are used actually, the color difference may remain in some objects even if the correction lookup table is used. Hereinafter, the color difference that remains after correction using the correction lookup table is called residual color difference. When there is such residual color difference, a user needs much effort to find the residual color difference by visually comparing the pickup image of the reference image pickup apparatus and the pickup image of adjustment image pickup apparatus.

SUMMARY OF THE INVENTION

The present invention provides a technique that easily discriminates the residual color difference between a plurality of image pickup apparatuses at a site where the image pickup apparatuses are used.

Accordingly, an aspect of the present invention provides a display control apparatus including a memory device that stores a set of instructions, and at least one processor that executes the set of instructions to obtain an adjustment image from an adjustment image pickup apparatus that performs predetermined color matching with a reference image pickup apparatus, generate residual color difference information showing color difference from a reference image picked up by the reference image pickup apparatus that remains in the adjustment image, and generate display information from the residual color difference information.

The present invention enables easy discrimination of the residual color difference between the reference image pickup apparatus and the adjustment image pickup apparatus at the site where these image pickup apparatuses are used.

Further features of the present invention will become apparent from the following description of exemplary embodiments with reference to the attached drawings.

BRIEF DESCRIPTION OF THE DRAWINGS

FIG. 5 is a view showing an example of a combination of RGB values of color patches in the pickup images in FIG. 4.

FIG. 6 is a view showing an example of a combination of XYZ values of the color patches obtained on the basis of the RGB values of the color patches in FIG. 5.

FIG. 7 is an explanatory view of an example of the correction LUT generated by the display control apparatus in FIG. 1.

FIG. 9 is a view showing an example of a combination of RGB values of color patches in an image from the target camera to which color matching has been applied.

FIG. 10 is a view showing an example of a combination of XYZ values after the color matching that are obtained on the basis of the RGB values of the color patches in FIG. 9.

FIG. 12 is a table showing correspondence relations between ranges of a residual color difference value defined by the residual color difference information and conversion colors used as colors of pixels included in the respective ranges.

DESCRIPTION OF THE EMBODIMENTS

Figure 1:
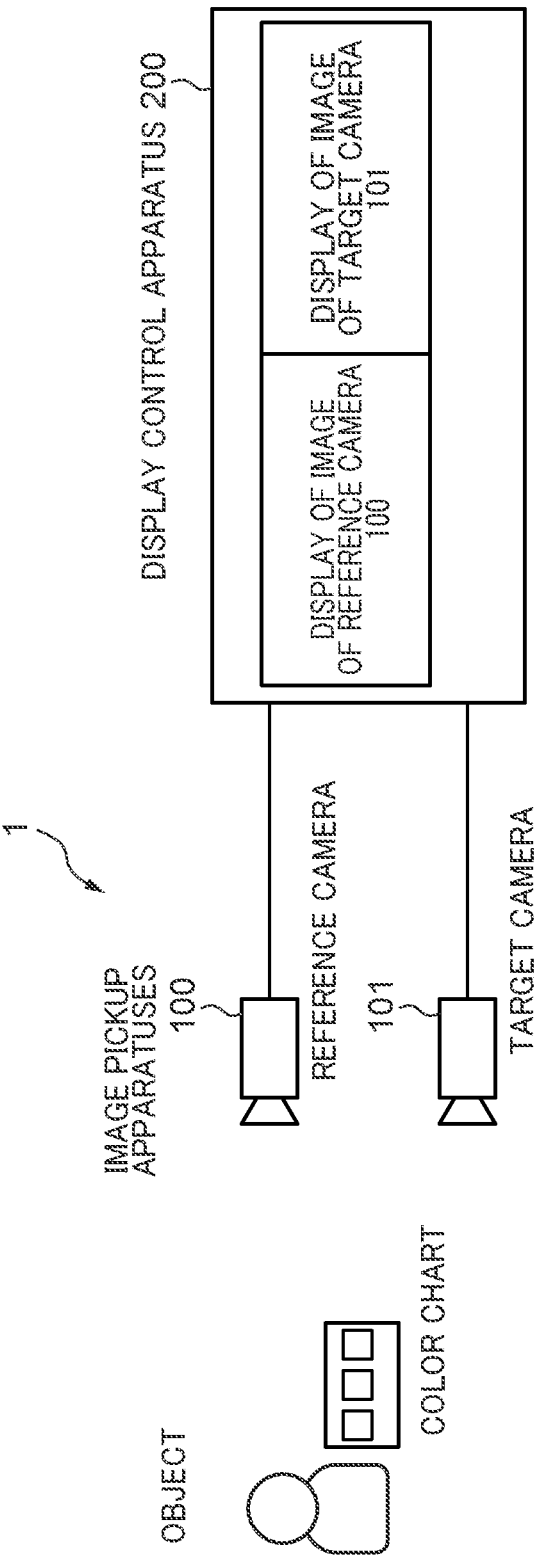
FIG. 1 is a configuration diagram showing a color difference correction system that corrects color difference between a plurality of image pickup apparatuses and includes a display control apparatus according to a first embodiment of the present invention.

Hereafter, embodiments according to the present invention will be described in detail by referring to the drawings. However, configurations described in the following embodiments are just examples, and the scope of the present invention is not limited to the configurations described in the embodiments.

FIG. 1 is a configuration diagram showing a color difference correction system that corrects color difference between a plurality of image pickup apparatuses. The color difference correction system 1 in FIG. 1 has a display control apparatus 200 according to a first embodiment of the present invention. A reference camera 100 that is an example of a reference image pickup apparatus and a target camera 101 that is an example of an adjustment image pickup apparatus are connected to the display control apparatus 200 via image lines. The reference camera 100 and target camera 101 pick up a same type object like a color chart.

The reference camera 100 outputs a pickup image to the display control apparatus 200 through the image line. The target camera 101 outputs a pickup image to the display control apparatus 200 through the image line. The reference camera 100 and target camera 101 may pick up static images or may pick up video images.

The display control apparatus 200 compares input pickup images and generates a correction lookup table (LUT) for color matching that can be used by the target camera 101. When using the correction LUT generated in this way, the target camera 101 can pick up an image of which color difference from an image of the reference camera 100 is reduced. The process that reduces the color difference between the images of the apparatuses using the correction LUT etc. is called color matching. When the target camera 101 that is color-matched with the reference camera 100 is used in the same image pickup environment with the reference camera 100, a pickup image (an adjustment image) of which colors are close to that of a pickup image (a reference image) of the reference camera 100 can be obtained.

Figure 2:
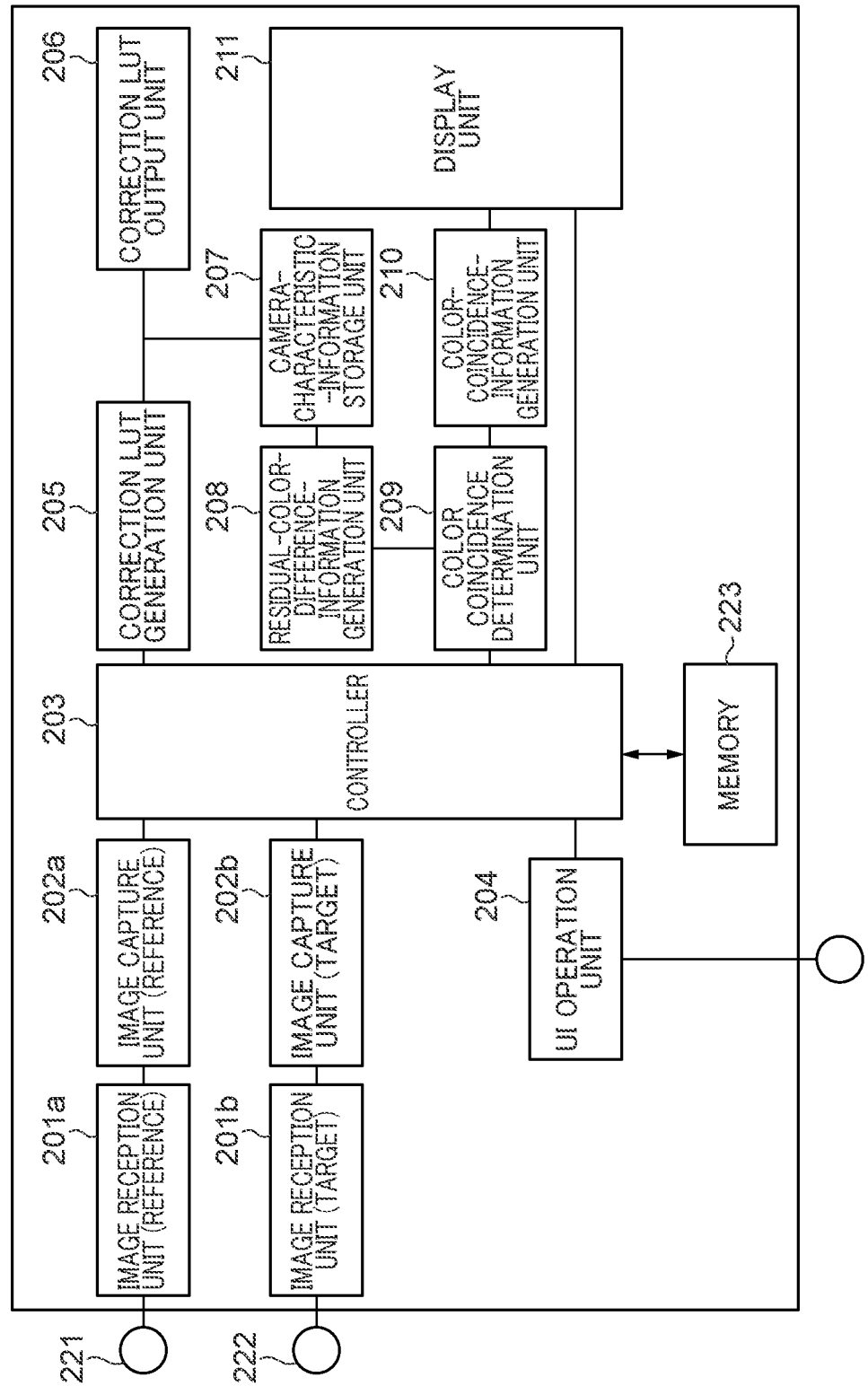
FIG. 2 is a block diagram showing a main configuration of the display control apparatus in FIG. 1.

FIG. 2 is a block diagram showing a main configuration of the display control apparatus 200 in FIG. 1. The reference camera 100 is connectable with a first input terminal 221 through the image line. The reference camera 101 is connectable with a second input terminal 222 through the image line. A memory 223 stores programs that are executed by a controller 203 and various kinds of data. The memory 223 is constituted by a nonvolatile semiconductor memory, an SSD, an HDD, a RAM, or the like. A work area that is used when running a program is allocated to the RAM. The nonvolatile semiconductor memory, SSD, HDD, etc. can record a program and data in a nonvolatile manner.

The controller 203 controls the entire display control apparatus 200, reads a program from the memory 223, and controls respective sections of the apparatus. The controller 203 is a CPU, for example.

The image reception unit 201b receives an image from the target camera 101 connected to the second input terminal 222 through the image line and outputs it to an image capture unit 202b. The image capture unit 202b captures the image received from the target camera 101. Then, the image capture unit 202b outputs the image captured to the controller 203. The image capture unit 202b can obtain an image before performing the color matching and the image after performing the color matching from the target camera 101 as an obtaining unit. The image capture unit 202b captures an image of one frame of a video image by recording it to a frame memory. Although an image of one frame may be an interlace image, a progressive image is preferable.

The image reception unit 201a receives an image from the reference camera 100 connected to the first input terminal 221 through the image line and outputs it to an image capture unit 202a. The image capture unit 202a captures the image received from the reference camera 100. Then, the image capture unit 202a outputs the image captured to the controller 203.

A UI operation unit 204 receives an operation from a user and outputs a corresponding instruction to the controller 203. For example, a pointing device, a pen tablet, etc. that are operated by a user are connected to the UI operation unit 204. The UI operation unit 204 receives operations to instruct the color matching, switching of a display content, etc. Moreover, the UI operation unit 204 receives an operation to select each of rectangle color patches in an image. In this case, the UI operation unit 204 outputs a rectangle area from a start point to an end point of a color patch selected by the user to the controller 203 as area information about the color patch.

The controller 203 achieves various control processes, such as a record control process, a display control process, and an image process, by controlling the respective sections of the display control apparatus 200. For example, the controller 203 displays the image from the reference camera 100 and the image from the target camera 101 on the display unit 211 side by side, as shown in FIG. 1. The user can compare the image from the reference camera 100 and the image from the target camera 101 by viewing the display unit 211.

When the area information about the color patch is input through the UI operation unit 204, the controller 203 superimposes a rectangle frame on the image currently displayed on the display unit 211. The controller 203 may generate a warning screen and a message screen and may display them on the display unit 211. When generating the correction LUT, the controller 203 outputs the image from the reference camera 100, the image from the target camera 101, and the area information about the color patches in the images to a correction LUT generation unit 205.

Moreover, when generating residual color difference information, the controller 203 outputs the image from the target camera 101 to a color coincidence determination unit 209. Moreover, the controller 203 may generate a display image for showing the residual color difference information and may display it on the display unit 211. This display image corresponds to display information generated on the basis of the residual color difference information. Moreover, the controller 203 switches a display content on the display unit 211 in accordance with a user operation through the UI operation unit 204. Thereby, the controller 203 can switch generation of the correction LUT and display of the residual color difference information on the basis of the user operation.

The correction LUT generation unit 205 obtains the information for generating the correction LUT from the controller 203 and generates the correction LUT for matching the colors of the image picked up by the target camera 101 with the colors of the image picked up by the reference camera 100. The information obtained from the controller 203 includes the image from the reference camera 100, the image from the target camera 101, and the area information about the color patches corresponding to these images. Then, the correction LUT generation unit 205 outputs the correction LUT generated to a correction LUT output unit 206. Moreover, the correction LUT generation unit 205 outputs the RGB values of the color patches in the images from the cameras and the image from the target camera 101, which are used to generate the correction LUT, to a camera-characteristic-information storage unit 207.

The correction LUT output unit 206 converts the correction LUT input from the correction LUT generation unit 205 into a file of a format that the target camera 101 can import. For example, the file of the correction LUT generated by the correction LUT output unit 206 may be recorded in a portable medium (not shown) and may be imported to the target camera 101 by copying. Thereby, the target camera 101 can pick up a color-matched image to which the color matching is applied using the correction LUT. It should be noted that the correction LUT output unit 206 may transmit the file of the correction LUT to the target camera 101 by wireless communication etc. Moreover, when the target camera 101 and the display control apparatus 200 are connected via a LAN cable, the correction LUT output unit 206 may transmit the file of the correction LUT to the target camera 101 via the LAN cable.

The camera-characteristic-information storage unit 207 records and holds camera characteristic information. The unit 207 may be constituted by a storage medium like an independent RAM or may function by using a part of the memory 223. The camera characteristic information includes various kinds of information about the color matching of the target camera 101. The camera characteristic information may include the information about the reference camera 100 and the information about the target camera 101 that are related to the color matching, for example. Moreover, the camera characteristic information may include the RGB values of the color patches obtained in performing the color matching of the reference camera 100 and the target camera 101, for example. Moreover, the camera characteristic information may include the image from the reference camera 100 used for the color matching with the target camera 101.

A residual-color-difference-information generation unit 208 generates residual color difference information on the basis of the camera characteristic information held by the camera-characteristic-information storage unit 207 by calculating color difference between the image from the target camera 101 and the image from the reference camera 100 on a pixel basis. Then, the residual-color-difference-information generation unit 208 may generate the residual color difference information about the color difference that remains in the image from the target camera 101 after the color matching using the camera characteristic information held by the camera-characteristic-information storage unit 207. The residual-color-difference-information generation unit 208 may calculate the color difference between each pixel of the image from the target camera 101 and each pixel of the held image from the reference camera 100. Thereby, the residual-color-difference-information generation unit 208, as a residual color difference generation means, generates the residual color difference information showing the residual color difference that remains in the image from the target camera 101 that performs the color matching as the difference from the image from the reference camera 100. The residual color difference information shows the residual color difference that remains between each pixel value of the image from the target camera 101 after performing the color matching and each pixel value of the image from the reference camera 100.

A color coincidence determination unit 209 determines a color coincidence degree between each pixel value of the image from the target camera 101 and each pixel value of the image from the reference camera 100. The color coincidence determination unit 209 outputs each pixel value of the image from the target camera 101 to the residual-color-difference-information generation unit 208 and determines the color coincidence degree on the basis of the residual color difference information generated by the residual-color-difference-information generation unit 208. A color-coincidence-information generation unit 210 generates a display image for showing the residual color difference information about the image from the target camera 101 that performs the color matching.

For example, the color-coincidence-information generation unit 210 may generate the display image for showing the residual color difference information by converting each pixel value of the image from the corresponding target camera 101 in accordance with the color coincidence degree determined by the color coincidence determination unit 209. In this case, when the color coincidence degree of the pixel is lower than a threshold, the color-coincidence-information generation unit 210 may convert the pixel value of the pixel into a pixel value that shows the residual color difference. Thereby, the color-coincidence-information generation unit 210, as a display information generation means, generates display information based on the residual color difference information. The display unit 211 has a monitor, for example, and displays an image on the monitor. For example, the display unit 211 may display the warning screen received from the controller 203, a residual-color-difference value Display image received from the color-coincidence-information generation unit 210, etc.

It should be noted that the configuration of the image processing apparatus is not limited to the configuration shown in FIG. 2. For example, each control process can be executed by a single hardware unit or a plurality of hardware units may function as a single means as a whole by sharing a process. Moreover, a single hardware unit may function as a plurality of means depending on programs to run. This is the same about a storage process. Various kinds of data may be stored to a single hardware unit like the memory 223. Or a plurality of recording media may be prepared depending on various kinds of storage processes. Moreover, the display unit 211 is not necessarily mounted in the display control apparatus 200. The display control apparatus 200 should have at least an interface with the display unit 211.

Figure 3:
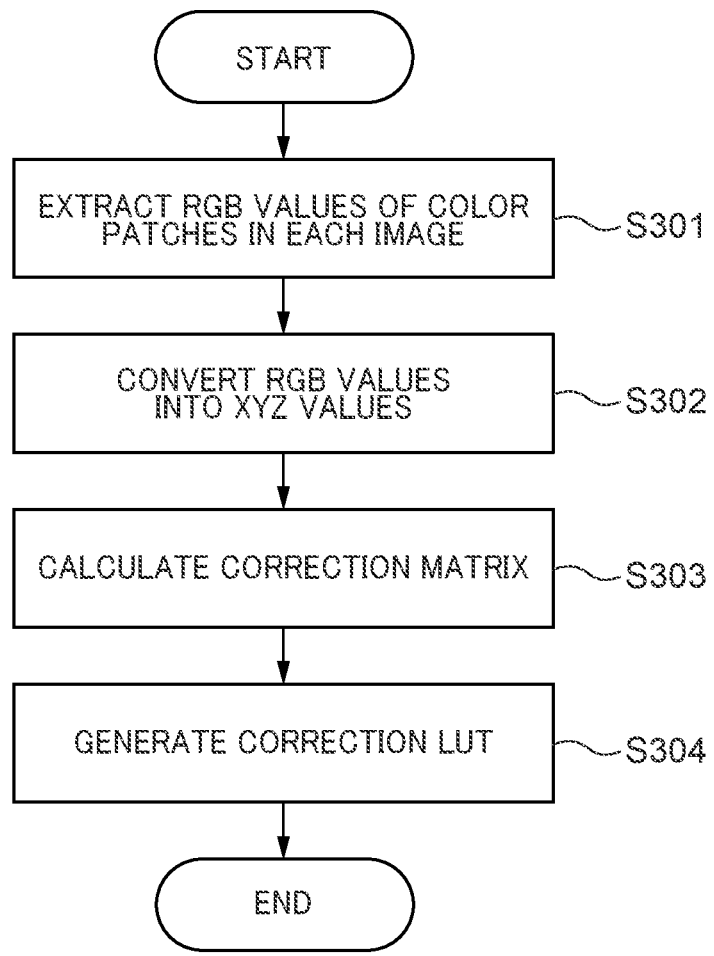
FIG. 3 is a flowchart showing a process for generating a correction LUT (lookup table) by the display control apparatus in FIG. 1.

Hereinafter, a process that generates the correction LUT used by the target camera 101 for the color matching is described first. FIG. 3 is a flowchart showing the process that the display control apparatus 200 generates the correction LUT for matching a color characteristic of the target camera 101 to a color characteristic of the reference camera 100 by comparing the image from the reference camera 100 and the image from the target camera 101. A user operates the UI operation unit 204 to generate the correction LUT. For example, the user selects an item of "Generate color matching LUT" in a menu screen. The controller 203 starts the process to generate the correction LUT by the display control apparatus 200 in response to the input operation through the UI operation unit 204.

Figure 4:
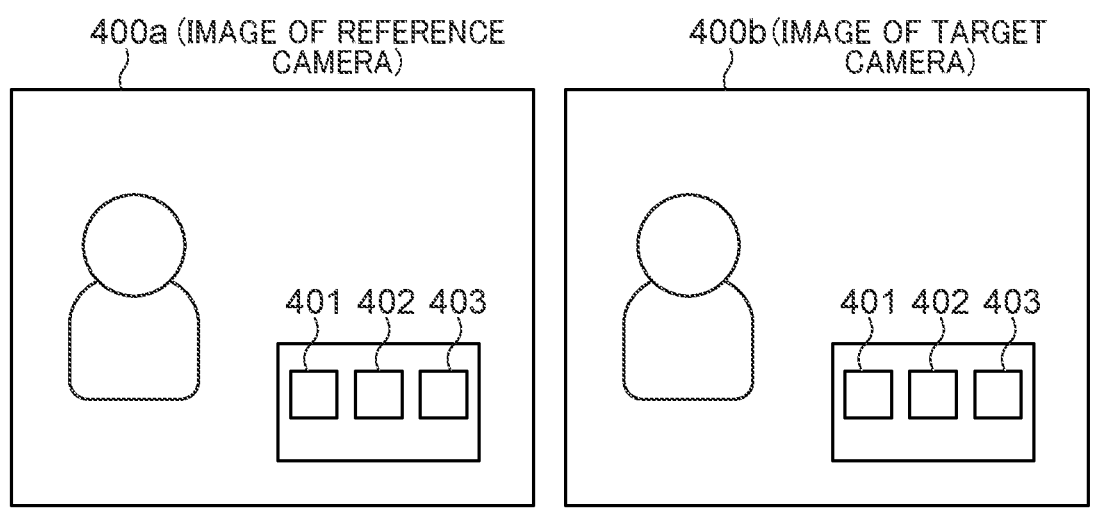
FIG. 4 is a view showing an example of a combination of a pickup image of a reference camera and a pickup image of a target camera that are currently displayed on a display unit of the display control apparatus.

FIG. 4 is a view showing an example of a combination of a pickup image 400a of the reference camera 100 and a pickup image 400b of the target camera 101 that are currently displayed on the display unit 211. Each of the images 400a and 400b in FIG. 4 has predetermined color patches 401, 402, and 403. The color patch 401 is red. The color patch 402 is green. The color patch 403 is blue. The user operates the UI operation unit 204 to generate the correction LUT.

The controller 203 selects areas of the color patches 401, 402, and 403 in the images 400a and 400b on the basis of the user operations input through the UI operation unit 204. After that, the controller 203 controls the respective sections of the display control apparatus 200 to execute the process in FIG. 3. The controller 203 outputs the area information about the selected color patches and the images 400a and 400b to the correction LUT generation unit 205. Thereby, this control is started. Although it is preferable to include the predetermined color patches 401, 402, and 403 in the images 400a and 400b that are compared to generate the correction LUT, images that do not include such color patches can be also used to generate the correction LUT.

In a step S301 in FIG. 3, the correction LUT generation unit 205 extracts the RGB values showing colors of the color patches in the images 400a and 400b. The correction LUT generation unit 205 may extract the RGB values using the image 400a from the reference camera 100, the image 400b form the target camera 101, and the area information about the color patches 401, 402, and 403 that are received from the controller 203. Then, the correction LUT generation unit 205 stores the extracted RGB values of the color patches of the images 400a and 400b to the camera-characteristic-information storage unit 207 as camera characteristic information. The correction LUT generation unit 205 may extract averages of pixel values in the areas of the designated color patches 401, 402, and 403 as the RGB values or may extract the pixel values of the centers of the areas as the RGB values.

In a step S302, the correction LUT generation unit 205 converts the RGB values of the color patches 401, 402, and 403 into XYZ values. The correction LUT generation unit 205 may convert the RGB values into the XYZ values using the following formula 1, for example. The following formula 1 is a determinant that converts the RGB values into the XYZ values using a conversion matrix (an RGB-to-XYZ conversion matrix). For example, the RGB-to-XYZ conversion matrix can be generated by calculation using an xy coordinate of a display color gamut of the display control apparatus 200 and an xy coordinate of a white point. Moreover, it is preferable to substitute values that are obtained by normalizing the RGB values of the color patches 401, 402, and 403 into values r, g, and b of the following formula 1. Thereby, the RGB values of the color patches 401, 402, and 403 of the images in FIG. 5 are converted into the XYZ values of the color patches 401, 402, and 403 shown in FIG. 6, for example.

$$\begin{bmatrix} X \\ Y \\ Z \end{bmatrix} = \begin{bmatrix} RGB\text{-to-}XYZ \\ \text{Conversion Matrix} \end{bmatrix} \begin{bmatrix} r \\ g \\ b \end{bmatrix} \quad \text{Formula 1}$$

FIG. 5 is a view showing an example of a combination of the RGB values of the color patches 401 in the pickup images 400a and 400b in FIG. 4. FIG. 6 is a view showing an example of a combination of the XYZ values of the color patches obtained on the basis of the RGB values of the color patches 401, 402, and 403 in FIG. 4. The XYZ values converted from the RGB values of the color patches 401, 402, and 403 in the image from the reference camera 100 shall be an arithmetic matrix R. The XYZ values converted from the RGB values of the color patches 401, 402, and 403 in the image from the target camera 101 shall be an arithmetic matrix T.

In a step S303 in FIG. 3, the correction LUT generation unit 205 calculates a correction matrix M for matching the color characteristic of the target camera 101 with the color characteristic of the reference camera 100. The correction matrix M is a matrix for correcting the XYZ values of the color patches in the image from the target camera 101 to the XYZ values of the color patches in the image from the reference camera 100. The correction matrix M can be calculated by the following formula 2, for example.

[Correction Matrix $M$]=[Arithmetic Matrix $R$][Arithmetic Matrix $T$]$^{-1}$      Formula 2

In a step S304, the correction LUT generation unit 205 generates the correction LUT using the correction matrix M calculated in the step S303. The correction LUT generation unit 205 outputs the correction LUT generated to the correction LUT output unit 206. Thereby finishes the process of FIG. 3.

FIG. 7 is an explanatory view of an example of the correction LUT generated by the display control apparatus 200 in FIG. 1. The correction LUT is used to convert the RGB values (In) at the left side in FIG. 7 into the XYZ values (Out) at the right side in FIG. 7. The correction LUT may consist of lattice points of 17*17*17. The RGB values (In) of each lattice point of the correction LUT can be converted into the XYZ values using the RGB-to-XYZ conversion matrix mentioned above. Then, corrected XYZ values $X_C$, $Y_C$, and $Z_C$ of such a lattice point are calculable by the following formula 3 using the XYZ values X, Y, Z of the lattice point and the correction matrix M mentioned above. Moreover, the corrected RGB values (Out) corresponding to the RGB values (In) of each lattice point of the correction LUT are calculated using the corrected XYZ values $X_C$, $Y_C$, and $Z_C$ of the lattice point and an inverse matrix of the RGB-to-XYZ conversion matrix. In the correction LUT in FIG. 7, the RGB values (In) and RGB values (Out) are associated by such a process.

$$\begin{bmatrix} X_C \\ Y_C \\ Z_C \end{bmatrix} = [\text{Correction Matrix } M] \begin{bmatrix} X \\ Y \\ Z \end{bmatrix} \quad \text{Formula 3}$$

Moreover, the correction LUT generation unit 205 calculates an arithmetic matrix S used in a flow of a residual color difference calculation process mentioned later by the following formula 4 using the above-mentioned arithmetic matrix T and the correction matrix M. The correction LUT generation unit 205 stores the calculated arithmetic matrix S in the camera-characteristic-information storage unit 207.

[Arithmetic Matrix $S$]=[Correction Matrix $M$][Arithmetic Matrix $T$]          Formula 4

The above process enables the display control apparatus 200 to generate the correction LUT that reduces the color difference of the target camera 101 and improves the coincidence degree with the color characteristic of the reference camera 100. The target camera 101 to which such color matching is applied and the reference camera 100 can be used to pick up the same object as shown in FIG. 1 by reducing the color difference therebetween. Each of the target camera 101 and reference camera 100 picks up a static image or a video image by receiving light entering through an optical system using an image sensor like a CCD sensor or a CMOS sensor, for example. There is a difference of a light receiving characteristic etc. in image sensors. In such a case, it is expectable that the colors of the pickup image of the target camera 101 and the colors of the pickup image of the reference camera 100 coincide satisfactorily by using the above-mentioned correction LUT to the image generation by the target camera 101.

However, even if the target camera 101 uses such a correction LUT, not all the colors of the pickup image of the target camera 101 match the colors of the pickup image of the reference camera 100. On a site where a plurality of image pickup apparatuses are used actually, color difference may remain in some objects even if the above-mentioned correction LUT is used. Generally, although large color difference value Does not remain in the entire color space, color difference that is relatively easy to confirm visually may remain in some colors.

In this way, the color difference that remains also after the predetermined color matching, such as an application of the correction LUT, is called residual color difference. When there is such residual color difference, it is difficult for a user to find the residual color difference by comparing the pickup image of the reference camera 100 with the pickup image of the target camera 101 to which the color matching has been applied by visual observation.

On a site where a plurality of image pickup apparatuses are used, it is required to easily discriminate the residual color difference that may remain between the plurality of image pickup apparatuses. Accordingly, the display control apparatus 200 of this embodiment generates the above-mentioned correction LUT and further generates residual color difference information corresponding to the coincidence degree of the color characteristic of the target camera 101 after the color matching using the correction LUT. Then, the display control apparatus 200 supplies the residual color difference information to a user by displaying it so as to be easily discriminated.

Figure 8:
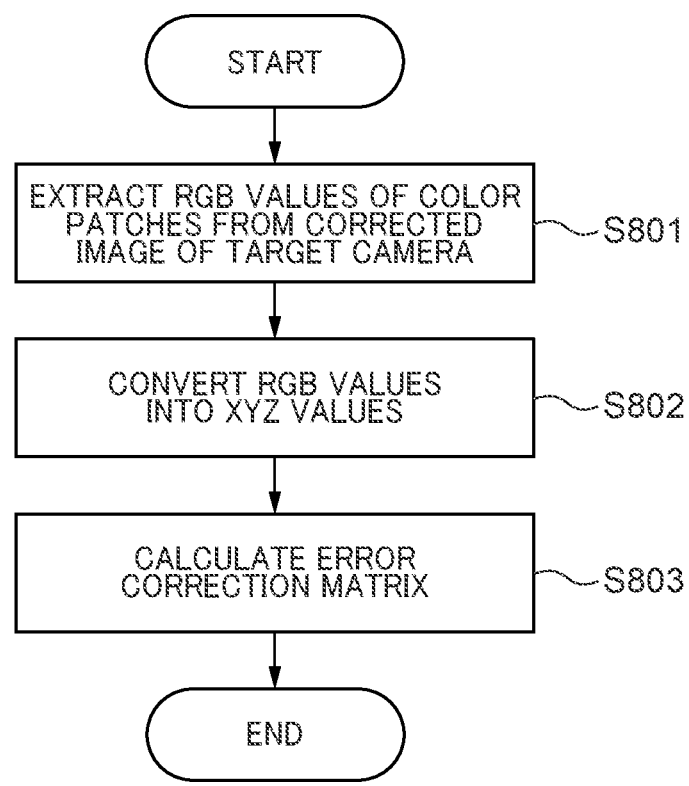
FIG. 8 is a flowchart showing a process for generating residual color difference information about the target camera that uses the correction LUT.

FIG. 8 is a flowchart showing a process for generating the residual color difference information about the target camera 101 that reads the correction LUT generated by the process of FIG. 3. The target camera 101 outputs the image to which the color matching is applied by using the read correction LUT to the display control apparatus 200. The user operates the UI operation unit 204 after generating the correction LUT. For example, the user selects an item of "Show color difference" from the menu screen. The controller 203 starts the residual color difference information generation process in FIG. 8 on the basis of an input operation through the UI operation unit 204. The controller 203 outputs the color-matched image that is picked up by the target camera 101 using the correction LUT to the color coincidence determination unit 209.

In a step S801, the color coincidence determination unit 209 extracts the RGB values of the color patches from the image on the basis of a color-matched image of the target camera 101 received from the controller 203 and the area information about the color patches. It should be noted that examples of the RGB values of the color patches obtained here are shown in FIG. 9 FIG. 9 is a view showing an example of a combination of RGB values of the color patches in the image from the target camera 101 after the color matching. Since the color matching is performed, the RGB values of the color patches in FIG. 9 are different from the RGB values of the color patches from the target camera 101 in FIG. 5.

In a step S802, the color coincidence determination unit 209 converts the RGB values of the color patches into XYZ values. The color coincidence determination unit 209 outputs the generated XYZ values of the color patches to the residual-color-difference-information generation unit 208. The conversion process by the color coincidence determination unit 209 may be the same as the conversion process by the correction LUT generation unit 205 in the step S302 mentioned above. FIG. 10 is a view showing an example of a combination of XYZ values after the color matching that are obtained on the basis of the RGB values of the color patches in FIG. 9. The XYZ values of the color patches obtained here are different from the XYZ values from the target camera 101 before the color matching shown in FIG. 6. Then, the XYZ values of the color patches obtained here are used as a 3-row and 3-column arithmetic matrix H.

In a step S803, the residual-color-difference-information generation unit 208 calculates an error correction matrix GM and stores it to the camera-characteristic-information storage unit 207. The residual-color-difference-information generation unit 208 may calculate the error correction matrix GM on the basis of the XYZ values of the color patches received from the color coincidence determination unit 209 and the arithmetic matrix S held in the camera-characteristic-information storage unit 207. It should be noted that the error correction matrix GM shows the residual color difference that remains after the color matching. Thereby finishes the process of FIG. 8.

The error correction matrix GM is a correction matrix for correcting the residual color difference. The error correction matrix GM can be calculated by the following formula 5 from the arithmetic matrix H, which shows the XYZ values of the color patches actually picked up by the target camera 101 after the color matching, and the arithmetic matrix S that is found by the above-mentioned formula 4.

[Error Correction Matrix $GM$]=[Arithmetic Matrix $S$][Arithmetic Matrix $H$]$^{-1}$        Formula 5

The display control apparatus 200 can generate the residual color difference information showing the color difference that remains in the image from the target camera 101 after the color matching by the above process. The residual color difference information corresponds to the error correction matrix GM. The residual color difference information is information about the value corresponding to the color coincidence degree in the image. The residual color difference information shows the color difference that remains in the adjustment image from the target camera 101 that performs the color matching as the difference from the reference image from the reference camera 100. Then, the residual color difference information may be recorded in the memory 223 that functions as the camera-characteristic-information storage unit 207, for example.

Next, the color-coincidence-information generation unit 210 generates the display image for displaying the residual color difference information about the image from the target camera 101 that performs the color matching on the display unit 211 on the basis of the residual color difference information generated. A part or the whole of the process by the color-coincidence-information generation unit 210 for generating the display image may be executed by the color coincidence determination unit 209. For example, the color coincidence determination unit 209 may determine the color coincidence degree between the pixel value of the image from the reference camera 100 and the pixel value of the image from the target camera 101.

Figure 11:
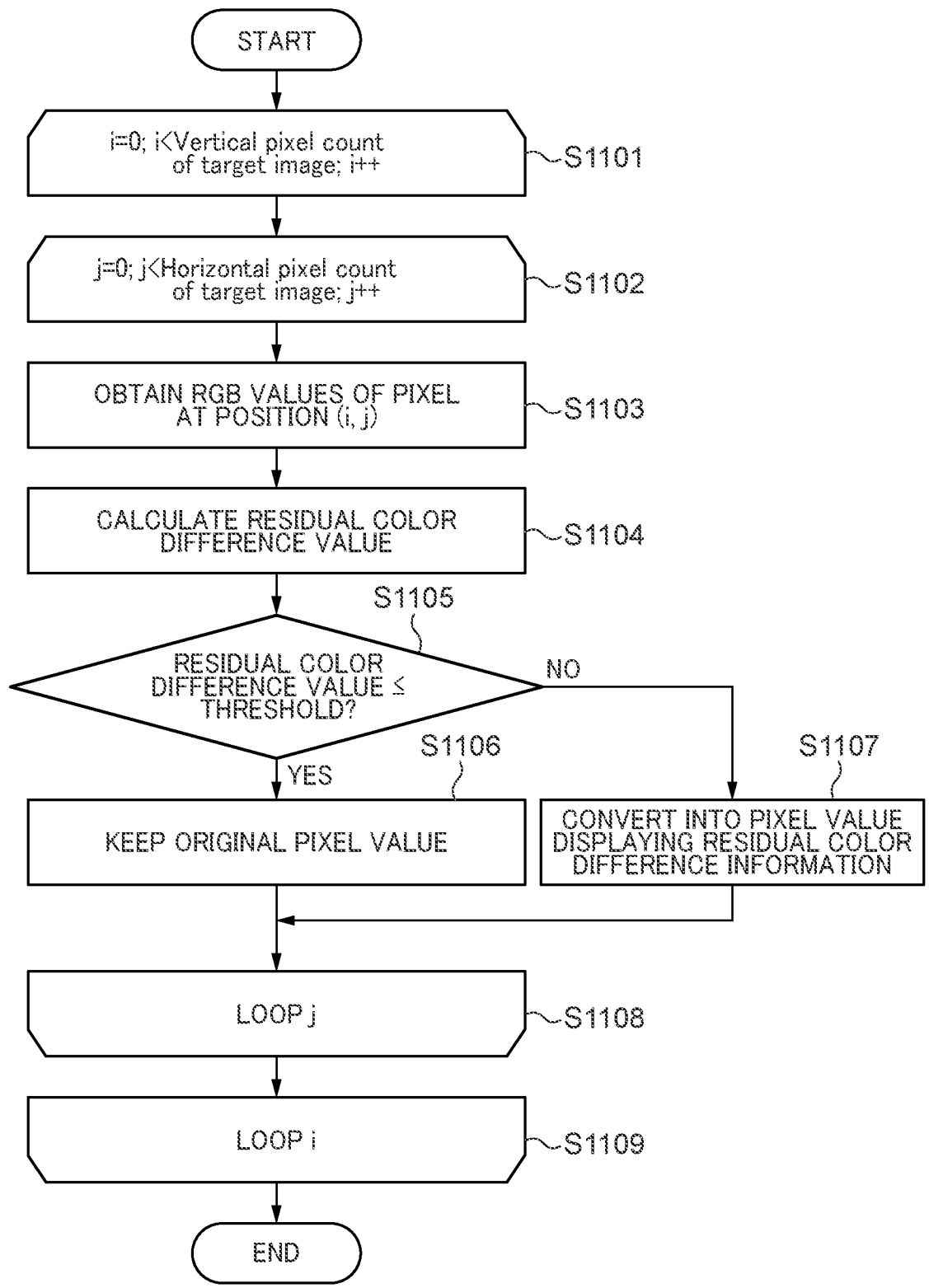
FIG. 11 is a flowchart showing a process for generating a display image for displaying the residual color difference information.

FIG. 11 is a flowchart showing a process for generating the display image for displaying the residual color difference information. The camera-characteristic-information storage unit 207 holds the residual color difference information that shows the residual color difference that remains in the adjustment image from the target camera 101 that performs the color matching as the difference from the reference image from the reference camera 100. When the UI operation unit 204 receives an instruction based on a predetermined user operation, the controller 203 instructs generation of the display image to the color-coincidence-information generation unit 210 through the color coincidence determination unit 209 in order to display the residual color difference information on the display unit 211. Thereby, the color-coincidence-information generation unit 210 starts the process of FIG. 11.

In a step S1101, the color-coincidence-information generation unit 210 obtains a vertical pixel count (the number of pixels in a vertical direction) of the image that is picked up by the target camera 101 and is processed by the color coincidence determination unit 209, and starts a first loop process. In the first loop process, a loop variable "i" is incremented by one for every loop and the loop process is finished when the loop variable "i" reaches the vertical pixel count. In a step S1102, the color-coincidence-information generation unit 210 obtains a horizontal pixel count (the number of pixels in a horizontal direction) of the image that is picked up by the target camera 101 and is processed by the color coincidence determination unit 209, and starts a second loop process. In the second loop process, a loop variable "j" is incremented for every loop by one and the loop process is finished when the loop variable "j" reaches the horizontal pixel count.

In a step S1103, the color-coincidence-information generation unit 210 obtains the RGB values of a pixel at a position (i, j) in the image from the target camera 101 that performs the color matching. In a step S1104, the color-coincidence-information generation unit 210 outputs the obtained RGB values of the pixel to the residual-color-difference-information generation unit 208 through the color coincidence determination unit 209. The residual-color-difference-information generation unit 208 compares the color of the obtained RGB values of the pixel concerned with the color of the pixel at the corresponding position in the image from the reference camera 100, and calculates the residual color difference value of the pixel concerned in the image from the target camera 101 that performs the color matching.

The color-coincidence-information generation unit 210 obtains the residual color difference information from the residual-color-difference-information generation unit 208 through the color coincidence determination unit 209. The residual-color-difference-information generation unit 208 converts the RGB values obtained through the color coincidence determination unit 209 into the XYZ values using an RGB-to-XYZ conversion matrix similar to that used in the step S302. After that, the residual-color-difference-information generation unit 208 calculates inherent corrected XYZ values $X_{TC}$, $Y_{TC}$, and $Z_{TC}$, which are obtained when the correction LUT is correctly applied, by using the converted XYZ values and the error correction matrix GM that is calculated in the step S803 by the following formula 6. Then, the residual-color-difference-information generation unit 208 calculates the residual color difference value D by the following formula 7 by using the inherent corrected XYZ values $X_{TC}$, $Y_{TC}$, and $Z_{TC}$, and the values X, Y, and Z that are obtained by XYZ-converting the RGB values obtained from the target camera 101. It should be noted that the arithmetic method of the residual color difference value D shown here is an example. The residual-color-difference-information generation unit 208 may calculate the residual color difference value D by using the RGB values obtained, for example.

$$\begin{bmatrix} X_{TC} \\ Y_{TC} \\ Z_{TC} \end{bmatrix} = \begin{bmatrix} \text{Error Correction} \\ \text{Matrix } GM \end{bmatrix} \begin{bmatrix} X \\ Y \\ Z \end{bmatrix} \quad \text{Formula 6}$$

$$D = \sqrt{(X_{TC} - X)^2 + (Y_{TC} - Y)^2 + (Z_{TC} - Z)^2} \quad \text{Formula 7}$$

In a step S1105, the color-coincidence-information generation unit 210 determines whether the residual color difference value D received from the residual-color-difference-information generation unit 208 is less than a threshold. The threshold of the residual color difference value is determined on the basis of the range of value that is allowable as the residual color difference. At this time point, the color-coincidence-information generation unit 210 grasps the position and the residual color difference value D of the pixel that is a target of the determination process. When the residual color difference value D is less than the threshold, the color-coincidence-information generation unit 210 proceeds with the process to a step S1106. When the residual color difference value D is not less than the threshold, the color-coincidence-information generation unit 210 proceeds with the process to a step S1107.

In the step S1106, the color-coincidence-information generation unit 210 executes the process that maintains the pixel value at the position of the pixel that is a target of the determination process in the image from the target camera 101 after the color matching. That is, the color-coincidence-information generation unit 210 does not convert the pixel value at the position of the pixel that is a target of the determination process. After that, the color-coincidence-information generation unit 210 proceeds with the process to a step S1108.

In the step S1107, the color-coincidence-information generation unit 210 converts the pixel value at the position of the pixel that is a target of the determination process in the image from the target camera 101 after the color matching into a pixel value for displaying the residual color difference information. The pixel value for displaying the residual color difference information represents a predetermined color that is easily distinguished from other pixels in the image from the target camera 101 after the color matching. After that, the color-coincidence-information generation unit 210 proceeds with the process to a step S1108.

In the step S1108, the color-coincidence-information generation unit 210 determines finishing about the second loop process started in the step S1102. When the loop variable "j" does not reach the horizontal pixel count, the color-coincidence-information generation unit 210 returns the process to the step S1102 and increments the variable "j" by one. The color-coincidence-information generation unit 210 repeats the process from the step S1102 to the step S1108 until the loop variable "j" reaches the horizontal pixel count of the image. The color-coincidence-information generation unit 210 repeats the second loop process from the step S1102 to the step S1108 by the horizontal pixel count of the image from the target camera 101 after the color matching. Thereby, the color-coincidence-information generation unit 210 executes the conversion process based on the residual color difference information about the pixels on one line aligned in the horizontal direction in the image from the target camera 101 after the color matching. The color-coincidence-information generation unit 210 proceeds with the process to a step S1109, when the loop variable "j" reaches the horizontal pixel count.

In the step S1109, the color-coincidence-information generation unit 210 determines finishing about the first loop process started in the step S1101. When the loop variable "i" does not reach the vertical pixel count, the color-coincidence-information generation unit 210 returns the process to the step S1101 and increments the variable "i" by one. The color-coincidence-information generation unit 210 repeats the process from the step S1101 to the step S1109 until the loop variable "i" reaches the vertical pixel count of the image. The color-coincidence-information generation unit 210 repeats the first loop process from the step S1101 to the step S1109 by the vertical pixel count of the image from the target camera 101 after the color matching. Thereby, the color-coincidence-information generation unit 210 executes the conversion process based on the residual color difference information about the pixels on lines aligned in the vertical direction in the image from the target camera 101 after the color matching. When the loop variable "i" reaches the vertical pixel count, the color-coincidence-information generation unit 210 finishes this process.

Thereby, the color-coincidence-information generation unit 210 generates the image in which pixel values of a part of pixels of the image from the target camera 101 after the color matching are converted into the pixel value that displays the residual color difference information as the display image that displays the residual color difference information. In this display image, a part where the residual color difference more than the threshold occurs in the image from the target camera 101 after the color matching is displayed by the pixel value that displays the residual color difference information. The color-coincidence-information generation unit 210 outputs the generated display image to the display unit 211. The display unit 211 displays the display image generated by the color-coincidence-information generation unit 210. The user can easily visually confirm the part where the residual color difference occurs in the image that is picked up by the target camera 101 after the color matching and is displayed on the display unit 211 because the part is displayed by the pixel value that displays the residual color difference information.

FIG. 12 is a table showing correspondence relations between ranges of the residual color difference value defined by the residual color difference information and conversion colors used as colors of pixels included in the respective ranges. In FIG. 12, the residual color difference value D is classified to three steps. Then, when the residual color difference value D is more than 0 and less than 1, the color-coincidence-information generation unit 210 determines that the difference value D is less than the threshold and does not convert the pixel value of the target position. When the residual color difference value D is more than 1 and less than 2, the color-coincidence-information generation unit 210 determines that the difference value D is not less than the threshold and converts the pixel value of the target position into the pixel value (R, G, B=128, 0, 0) that displays the residual color difference information. Moreover, when the residual color difference value D is two or more, the color-coincidence-information generation unit 210 determines that the difference value D is not less than the threshold and converts the pixel value of the target position into the pixel value (R, G, B=255, 0, 0) that displays the residual color difference information. A red tone of the pixel value (R, G, B=255, 0, 0) is stronger than the pixel value (R, G, B=128, 0, 0). In the display image, the color of the part where the residual color difference information showing that the residual color difference value is more than the threshold in the image from the target camera 101 that performs the color matching is converted into the different color depending on the value of the residual color difference information. The table of the correspondence relations in FIG. 12 is recorded in the memory 223. In this case, the color-coincidence-information generation unit 210 obtains the residual color difference and the threshold compared from the memory 223 and executes the determination in the step S1105 in accordance with the table of the correspondence relations in FIG. 12.

Figure 13:
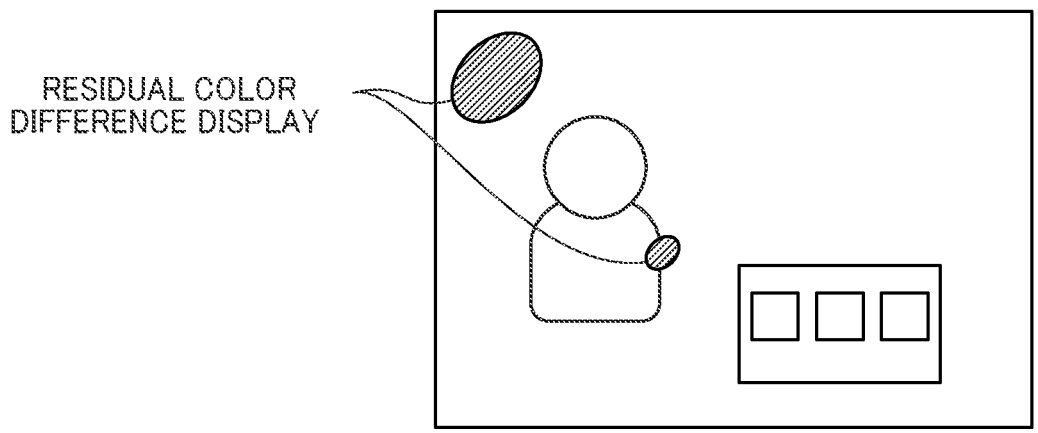
FIG. 13 is an explanatory view showing an example of the display image that displays the residual color difference information on the basis of the pickup image of the target camera that uses the correction LUT.

FIG. 13 is an explanatory view showing an example of the display image that displays the residual color difference information on the basis of the pickup image of the target camera 101 that uses the correction LUT. The display image in FIG. 13 is displayed on the display unit 211. In the display image in FIG. 13, its partial areas are displayed by the pixel value that displays the residual color difference information. When such a display image is displayed on the display unit 211, the user can determine the presence and degree of occurrence of the residual color difference intuitively only by glancing at the display unit 211. The user can immediately execute a necessary process that regenerates or adjusts the correction LUT, for example, on the basis of the determination. The user is not required to compare the pickup image from the target camera 101 that uses the correction LUT with the pickup image from the reference camera 100 that are displayed on the display unit 211 so as to discriminate the minute residual color difference that remains between them by visual observation.

As mentioned above, in this embodiment, the color coincidence degree between the pickup image of the reference camera 100 and the pickup image of the target camera 101 can be determined based on the information about the residual color difference between the cameras, and the residual color difference information that is the determination result can be explicitly displayed in the image from the target camera 101. The color difference correction system 1 of this embodiment can be used in order to discriminate easily the residual color difference between the image pickup apparatuses at the site where the reference camera 100 and the target camera 101 are used.

It should be noted that the threshold of the residual color difference value and the converted pixel value may be designated by the user through the UI operation unit 204. The user can designate so that a pixel of which the residual color difference value is less than the threshold will be displayed in monochrome. In this case, the display image of which a part where the residual color difference value is more than the threshold is colored will be displayed, which enables the user to intuitively discriminate the color coincidence degree.

Moreover, in the above-mentioned embodiment, the color-coincidence-information generation unit 210 generates the display image by converting the pixel value of the color-matched image from the target camera 101 into the pixel value that displays the residual color difference. In addition, for example, the color-coincidence-information generation unit 210 may generate the image for displaying the residual color difference as the display image. The color-coincidence-information generation unit 210 may display the display image for displaying the residual color difference on the display unit 211 by superimposing on the color-matched image from the target camera 101.

Moreover, the above-mentioned embodiment describes the method for calculating the residual color difference by calculating the error correction matrix using the red, green, and blue color patches 401, 402, and 403. In addition, for example, the color-coincidence-information generation unit 210 may calculate the residual color difference on the basis of the colors at the vertex of the lattice points of the correction LUT measured by the reference camera 100 and the target camera 101. Furthermore, the color-coincidence-information generation unit 210 may calculate the residual color difference using a table that stores the residual color difference values of all the colors. The table is generated by picking up all the colors by the reference camera 100 and the target camera 101 beforehand and is held in the camera-characteristic-information storage unit 207.

Next, the color difference correction system 1 including the display control apparatus 200 according to a second embodiment of the present invention will be described. Hereinafter, differences from the first embodiment are mainly described. The display control apparatus 200 of this embodiment differs from the first embodiment in the process of the color-coincidence-information generation unit 210. Moreover, it is different from the first embodiment in that a display image that is generated by the color-coincidence-information generation unit 210 on the basis of the color-matched image from the target camera 101 is a color distribution image that shows distribution of the residual color difference values.

Figure 14:
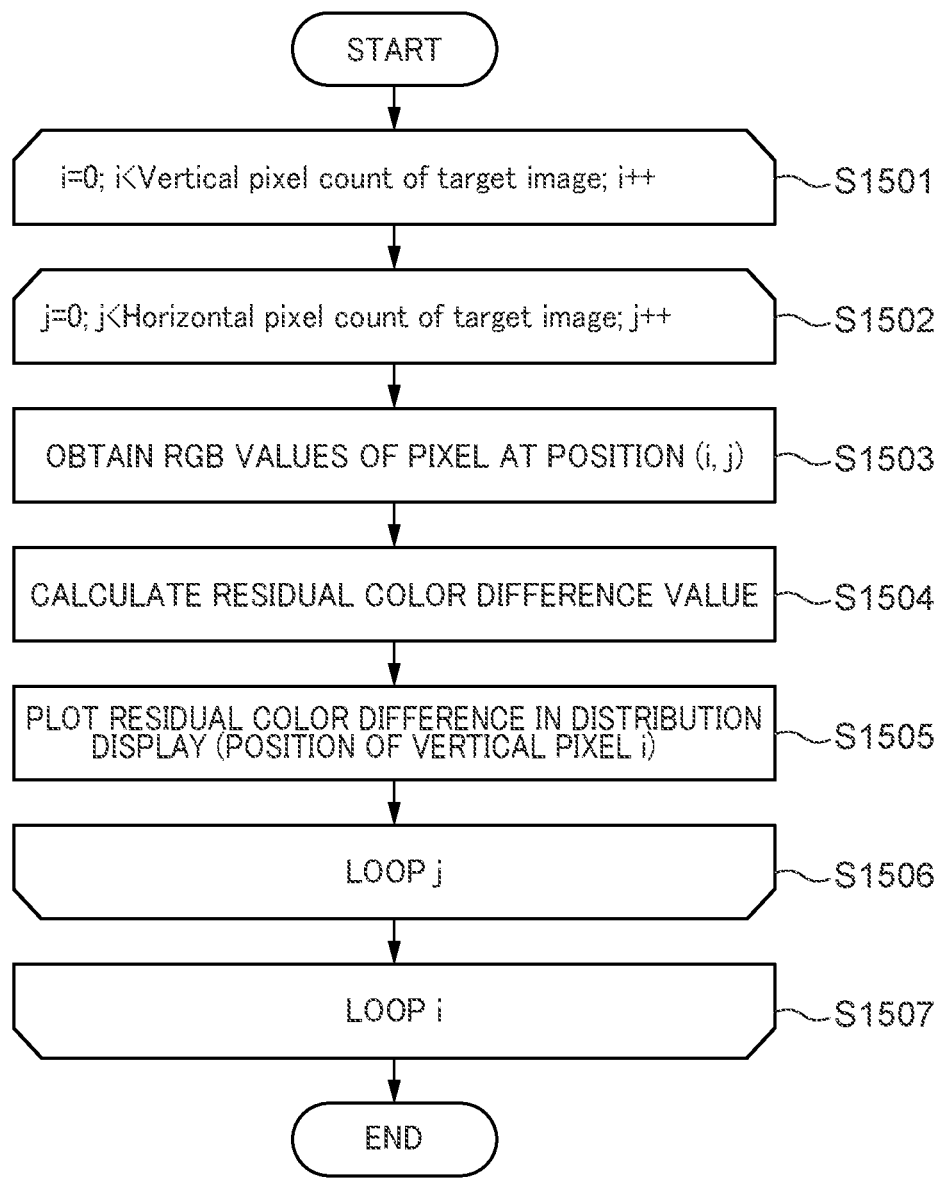
FIG. 14 is a flowchart showing a process for generating residual color difference information by a display control apparatus according to a second embodiment of the present invention.

FIG. 14 is a flowchart showing a process for generating residual color difference information by the display control apparatus 200 according to the second embodiment of the present invention. In the process in FIG. 14, the color-coincidence-information generation unit 210 generates distribution information about the residual color difference values by calculating a color coincidence degree (a residual color difference value) of each pixel of a color-matched image (an image to which a correction LUT is applied) from the target camera 101 with respect to a corresponding pixel of an image from the reference camera 100. When the UI operation unit 204 receives an instruction based on a predetermined user operation, the controller 203 instructs generation of the display image to the color-coincidence-information generation unit 210 through the color coincidence determination unit 209 in order to display the residual color difference information on the display unit 211. Thereby, the color-coincidence-information generation unit 210 executes the process of FIG. 14.

In a step S1501, the color-coincidence-information generation unit 210 obtains the vertical pixel count of the image that is picked up by the target camera 101 and is processed by the color coincidence determination unit 209, and starts a first loop process. In the first loop process, a loop variable "i" is incremented by one for every loop and the loop process is finished when the loop variable "i" reaches the vertical pixel count. In a step S1502, the color-coincidence-information generation unit 210 obtains a horizontal pixel count of the image that is picked up by the target camera 101 and is processed by the color coincidence determination unit 209, and starts a second loop process. In the second loop process, a loop variable "j" is incremented for every loop by one and the loop process is finished when the loop variable "j" reaches the horizontal pixel count.

In a step S1503, the color-coincidence-information generation unit 210 obtains the RGB values of a pixel at a position (i, j) in the image from the target camera 101 that performs the color matching. In a step S1504, the color-coincidence-information generation unit 210 outputs the obtained RGB values of the pixel to the residual-color-difference-information generation unit 208 through the color coincidence determination unit 209. The residual-color-difference-information generation unit 208 compares the color of the obtained RGB values of the pixel concerned with the color of the pixel at the corresponding position in the image from the reference camera 100, and calculates the residual color difference value of the pixel concerned in the image from the target camera 101 that performs the color matching. The color-coincidence-information generation unit 210 obtains the residual color difference information from the residual-color-difference-information generation unit 208 through the color coincidence determination unit 209.

In a step S1505, the color-coincidence-information generation unit 210 receives the residual color difference and the pixel position in the image at which the residual color difference is calculated from the color coincidence determination unit 209, and generates the display image displaying the residual color difference. In a step S1506, the color-coincidence-information generation unit 210 determines finishing about the second loop process started in the step S1502. When the loop variable "j" does not reach the horizontal pixel count, the color-coincidence-information generation unit 210 returns the process to the step S1502 and increments the variable "j" by one. The color-coincidence-information generation unit 210 repeats the process from the step S1502 to the step S1506 until the loop variable "j" reaches the horizontal pixel count of the image. The color-coincidence-information generation unit 210 repeats the second loop process from the step S1502 to the step S1506 by the horizontal pixel count of the image from the target camera 101 after the color matching. Thereby, the color-coincidence-information generation unit 210 plots the residual color difference values on the color distribution image showing distribution of the residual color difference values about the pixels on one line aligned in the horizontal direction in the image from the target camera 101 after the color matching. The color-coincidence-information generation unit 210 proceeds with the process to a step S1507, when the loop variable "j" reaches the horizontal pixel count.

In the step S1507, the color-coincidence-information generation unit 210 determines finishing about the first loop process started in the step S1501. When the loop variable "i" does not reach the vertical pixel count, the color-coincidence-information generation unit 210 returns the process to the step S1501 and increments the variable "i" by one. The color-coincidence-information generation unit 210 repeats the process from the step S1501 to the step S1507 until the loop variable "i" reaches the vertical pixel count of the image. The color-coincidence-information generation unit 210 repeats the first loop process from the step S1501 to the step S1507 by the vertical pixel count of the image from the target camera 101 after the color matching. Thereby, the color-coincidence-information generation unit 210 executes the conversion process based on the residual color difference information about the pixels on lines aligned in the vertical direction in the image from the target camera 101 after the color matching. When the loop variable "i" reaches the vertical pixel count, the color-coincidence-information generation unit 210 finishes this process.

Thereby, the color-coincidence-information generation unit 210 can generate the color distribution image showing distribution of the residual color difference values as the display image that displays the residual color difference information. The color-coincidence-information generation unit 210 outputs the generated color distribution image showing the distribution of the residual color difference values to the display unit 211. The display unit 211 displays the color distribution image showing the distribution of the residual color difference values.

Figure 15:
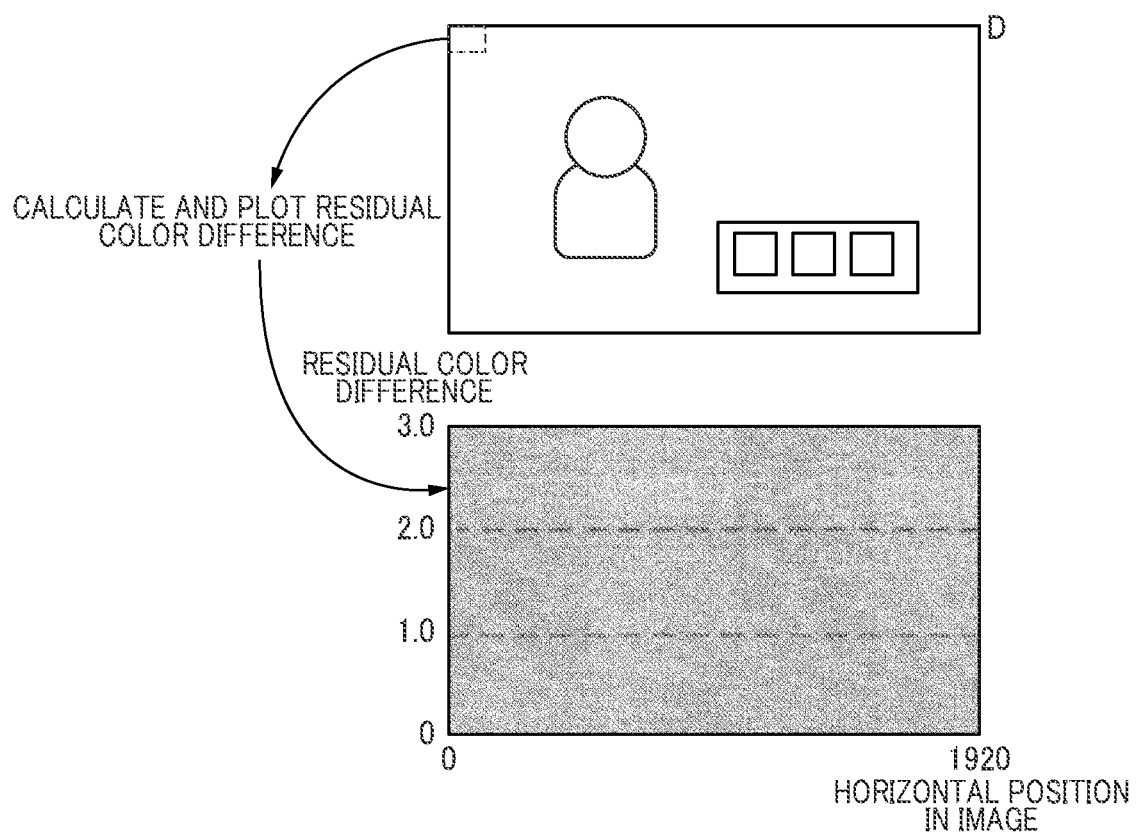
FIG. 15 is a view showing an example of a combination of a pickup image of the target camera that uses the correction LUT and a color distribution image that is generated independently therefrom to show distribution of residual color difference values.

FIG. 15 is a view showing an example of a combination of a pickup image of the target camera 101 that uses the correction LUT and a color distribution image that is generated independently therefrom to show the distribution of the residual color difference values. The color-coincidence-information generation unit 210 sequentially obtains the residual color difference information about each pixel of the pickup image, which is shown in an upper part in FIG. 15, of the target camera 101 that uses the correction LUT. Then, the color-coincidence-information generation unit 210 plots the residual color difference value of the pixel at the obtained position on the color distribution image showing the distribution of the residual color difference values shown in a lower part in FIG. 15. A background image of the color distribution image showing the distribution of the residual color difference values may be stored in the memory 223 beforehand. Then, the horizontal axis of the color distribution image showing the distribution of the residual color difference values shows a horizontal position in the image. A vertical axis shows the residual color difference value. In this case, the color-coincidence-information generation unit 210 plots a point showing the residual color difference value at the position on the vertical axis corresponding to the residual color difference value of the pixel at the obtained position. The color-coincidence-information generation unit 210 may repeat plotting of points at positions corresponding to the residual color difference values about the pixels on one line in the horizontal direction in the pickup image of the target camera 101 that uses the correction LUT.

Figure 16:
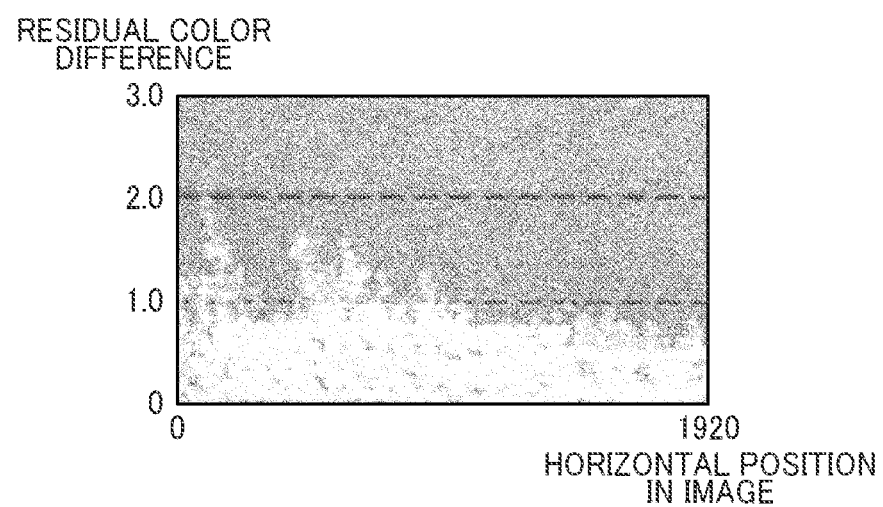
FIG. 16 is a view showing an example of the color distribution image that shows the distribution of the residual color difference values of a case of applying this embodiment.

FIG. 16 is a view showing an example of the color distribution image showing the distribution of the residual color difference values of a case of applying this embodiment. In the color distribution image showing the distribution of the residual color difference values in FIG. 16, the large residual color difference occurs in the left part in the image mainly. Moreover, the maximum residual color difference value reaches 2.0. The user can intuitively grasp a position and a degree of the residual color difference in the pickup image of the target camera 101 that uses the correction LUT by only visually confirming the color distribution image in FIG. 16 showing the distribution of the residual color difference values. Moreover, the color distribution image showing the distribution of the residual color difference values shown in FIG. 16 displays a color phase designated by the user. In addition, for example, the color distribution image showing the distribution of the residual color difference values may be displayed by superimposing a plurality of color phases by using different colors.

As mentioned above, in this embodiment, the color coincidence degree between the image from the reference camera 100 and the image from the target camera 101 is determined, and the color distribution image showing the distribution of the residual color difference values between these images is generated and displayed. The user can intuitively discriminate presence of the residual color difference and its position in the image by visually confirming the color distribution image showing the distribution of the residual color difference values.

The color-coincidence-information generation unit 210 may generate a display image other than the color distribution image showing the distribution of the residual color difference values mentioned above as a display image that displays the residual color difference. For example, the color-coincidence-information generation unit 210 may generate the display image that totals up a ratio of pixels of which the residual color difference values are more than a certain value for each line in the horizontal direction of the image as a display image for displaying residual color difference. Moreover, the color-coincidence-information generation unit 210 may display the distribution information of the residual color difference values of positions of pixels for each line in the vertical direction rather than in the horizontal direction. Moreover, the color-coincidence-information generation unit 210 may not necessarily generate the color distribution image showing the distribution of the residual color difference values about all the pixels of the color-matched image of the target camera 101. The color-coincidence-information generation unit 210 may generate the color distribution image showing the distribution of the residual color difference values about the specific color that is designated by the user, for example. In this case, the user can check the distribution of the residual color difference values for each color designated while switching the color to designate. Moreover, the color-coincidence-information generation unit 210 may display the residual color difference values in a vector scope image as a display image that displays the residual color difference values.

Figure 17:
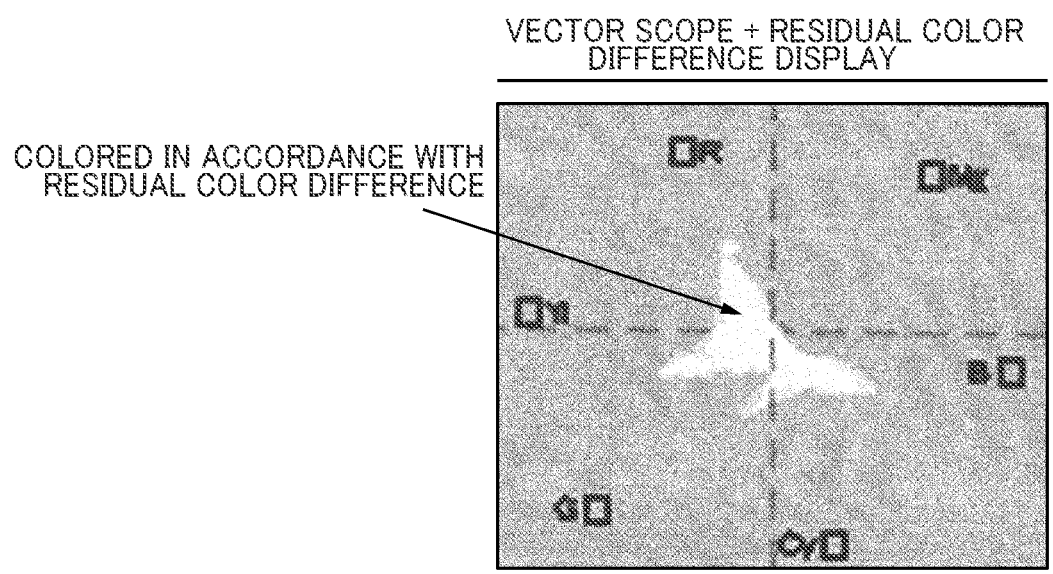
FIG. 17 is a view showing an example of a vector scope image that shows the residual color difference information.

FIG. 17 is a view showing an example of the vector scope image that displays the residual color difference information about the image from the target camera 101 that performs the color matching. The vector scope image shows a color phase and saturation of each pixel in an image basically. The color-coincidence-information generation unit 210 changes at least one of a color, a shape, and a size of a point plotted on such a vector scope image according to the color coincidence degree that can be determined on the basis of the residual color difference information. As a result, the center area in the vector scope image is colored in a color corresponding to the residual color difference as shown in FIG. 17.

Figure 18:
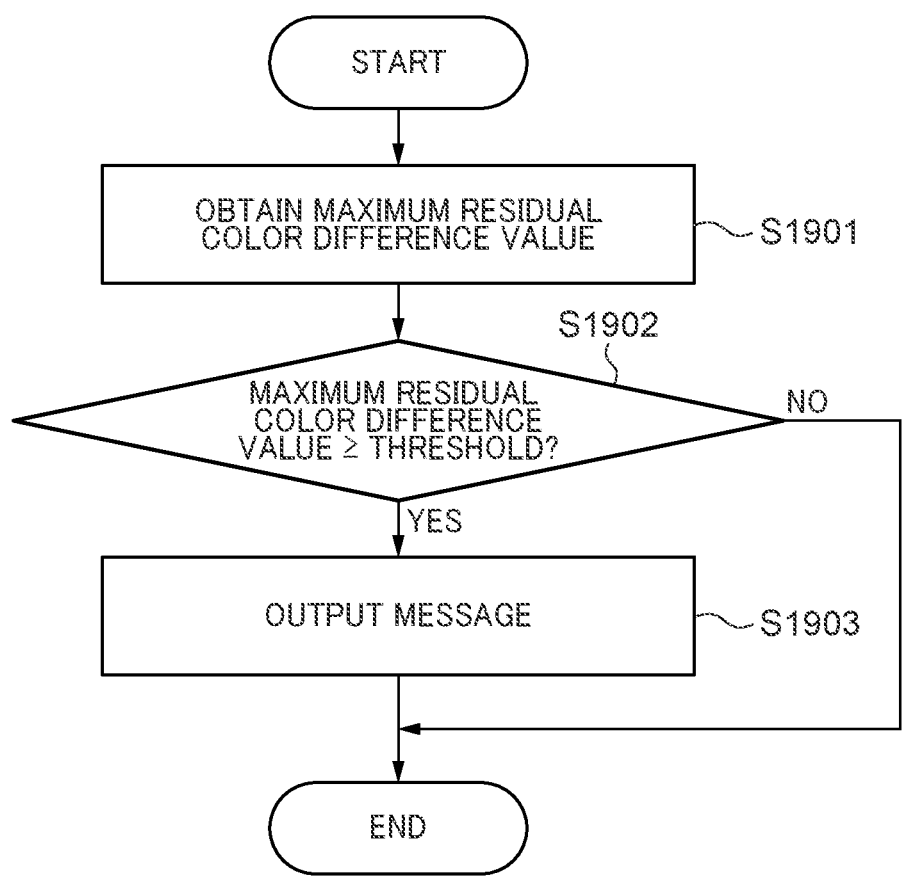
FIG. 18 is a flowchart showing a process for outputting a message when a value of the residual color difference information is not less than a threshold.

Moreover, the color-coincidence-information generation unit 210 may generate a screen or a message to prompt a user to perform the color matching again in addition to or in place of the generation of the above-mentioned various display images that display the residual color difference. FIG. 18 is a flowchart showing a process for outputting a message when the residual color difference value is not less than a threshold. The color-coincidence-information generation unit 210 may execute the process of FIG. 18 together with the process of FIG. 14 or after the process of FIG. 14.

In a step S1901, the color-coincidence-information generation unit 210 obtains the maximum residual color difference value from all the pixels in the color-matched image of the target camera 101. In a step S1902, the color-coincidence-information generation unit 210 determines whether the obtained maximum residual color difference value is equal to or more than its threshold. The threshold may be a residual color difference value that is expected to be reduced by regenerating the correction LUT, for example. In the example in FIG. 16, the threshold of the residual color difference value may be 2.0 or more.

When the obtained maximum residual color difference value is not less than the threshold, the color-coincidence-information generation unit 210 proceeds with the process to a step S1903. When the obtained maximum residual color difference value is less than the threshold, the color-coincidence-information generation unit 210 finishes this process. In the step S1903, the color-coincidence-information generation unit 210 generates the screen or message to prompt the user to perform the color matching again. The color-coincidence-information generation unit 210 outputs the generated screen or message to the display unit 211. The display unit 211 displays the screen or message. After that, the color-coincidence-information generation unit 210 finishes this process. Thereby, the color-coincidence-information generation unit 210 can generate the screen or message to prompt the user to perform the color matching again when the maximum residual color difference value that can be determined on the basis of the residual color difference information is not less than the threshold.

Although the present invention has been described in detail on the basis of the suitable embodiments, the present invention is not limited to these specific embodiments, and various configurations that do not deviate from the scope of the present invention are also included in the present invention.

For example, when generating the vector scope image shown in FIG. 17, the color-coincidence-information generation unit 210 may change the point plotted on the vector scope image in accordance with the RGB values of the image from the target camera 101 or the arithmetic value based on the RGB values. In addition, for example, when generating the vector scope image, the color-coincidence-information generation unit 210 may calculate the residual color difference from the image from the reference camera 100 simultaneously and may plot a different point in accordance with the residual color difference from the image from the reference camera 100. When such a point is plotted, the user can easily intuitively discriminate an area where the colors are matched in the vector scope image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-053840, filed Mar. 29, 2022, which is hereby incorporated by reference herein in its entirety.

What is claimed is:

1. A display control apparatus comprising:
a memory device that stores a set of instructions; and
at least one processor that executes the set of instructions to:
perform a predetermined color matching between a reference image picked up by a reference image pickup apparatus and a first adjustment image picked up by an adjustment target image pickup apparatus;
obtain a second adjustment image from the adjustment target image pickup apparatus;
generate residual color difference information showing color difference from the reference image picked up by the reference image pickup apparatus that remains in the second adjustment image; and
generate display information from the generated residual color difference information,
wherein the second adjustment image is an image picked up by the adjustment target image pickup apparatus and corrected using a correction information based on said predetermined color matching in the adjustment target image pickup apparatus after importing the correction information to the adjustment target image pickup apparatus.

2. The display control apparatus according to claim 1, wherein the predetermined color matching is performed by comparing images obtained by picking up a predetermined object by the adjustment target image pickup apparatus and the reference image pickup apparatus.

3. The display control apparatus according to claim 2, wherein the predetermined object comprises a color chart.

4. The display control apparatus according to claim 1, further comprising a holding unit configured to hold the reference image used for the predetermined color matching with the adjustment target image pickup apparatus,
   wherein the at least one processor executes instructions in the memory device to generate the residual color difference information corresponding to a color coincidence degree between the images by comparing the second adjustment image with the reference image held in the holding unit.

5. The display control apparatus according to claim 1, wherein the at least one processor executes instructions in the memory device to generate an image in which a color of an area where the residual color difference information is generated in the second adjustment image is converted into a color corresponding to a value of the residual color difference information as the display information.

6. The display control apparatus according to claim 1, wherein the at least one processor executes instructions in the memory device to
   generate a color distribution image corresponding to the second adjustment image as the display information; and
   display color distribution corresponding to a color coincidence degree that can be determined based on the residual color difference information on the color distribution image.

7. The display control apparatus according to claim 6, wherein the at least one processor executes instructions in the memory device to generate an image that displays at least one color phase among a plurality of color phases included in the second adjustment image as the color distribution image.

8. The display control apparatus according to claim 1, wherein the at least one processor executes instructions in the memory device to:
   generate a vector scope image about the second adjustment image as the display information; and
   plot a point of which at least one of a color, a shape, and a size corresponds to a color coincidence degree that can be determined based on the residual color difference information on the vector scope image.

9. The display control apparatus according to claim 1, wherein the at least one processor executes instructions in the memory device to generate and display at least one of a screen and a message that prompt a user to perform the predetermined color matching again in place of a display image that displays the residual color difference information in a case where a maximum residual color difference value that can be determined based on the residual color difference information is not less than a threshold.

10. The display control apparatus according to claim 1, wherein the at least one processor executes instructions in the memory device to generate and display at least one of a screen and a message that prompt a user to perform the predetermined color matching in addition to a display image that displays the residual color difference information in a case where a maximum residual color difference value that can be determined based on the residual color difference information is not less than a threshold.

11. A control method for a display control apparatus, the control method comprising:
   performing a predetermined color matching between a reference image picked up by a reference image pickup apparatus and a first adjustment image picked up by an adjustment target image pickup apparatus;
   obtaining a second adjustment image from the adjustment target image pickup apparatus;
   generating residual color difference information showing color difference from the reference image picked up by the reference image pickup apparatus that remains in the second adjustment image; and
   generating display information from the generated residual color difference information,
   wherein the second adjustment image is an image picked up by the adjustment target image pickup apparatus and corrected using a correction information based on said predetermined color matching in the adjustment target image pickup apparatus after importing the correction information to the adjustment target image pickup apparatus.

12. A non-transitory computer-readable storage medium storing a control program causing a computer to execute a control method for a display control apparatus, the control method comprising:
   performing a predetermined color matching between a reference image picked up by a reference image pickup apparatus and a first adjustment image picked up by an adjustment target image pickup apparatus;
   obtaining a second adjustment image from the adjustment target image pickup apparatus;
   generating residual color difference information showing color difference from the reference image picked up by the reference image pickup apparatus that remains in the second adjustment image; and
   generating display information from the generated residual color difference information,
   wherein the second adjustment image is an image picked up by the adjustment target image pickup apparatus and corrected using a correction information based on said predetermined color matching in the adjustment target image pickup apparatus after importing the correction information to the adjustment target image pickup apparatus.

* * * * *